Nov. 26, 1929.  W. W. MUIR  1,737,057
ANCHORAGE FOR AUTOMOBILE RADIATORS
Filed Dec. 6, 1926  4 Sheets-Sheet 1
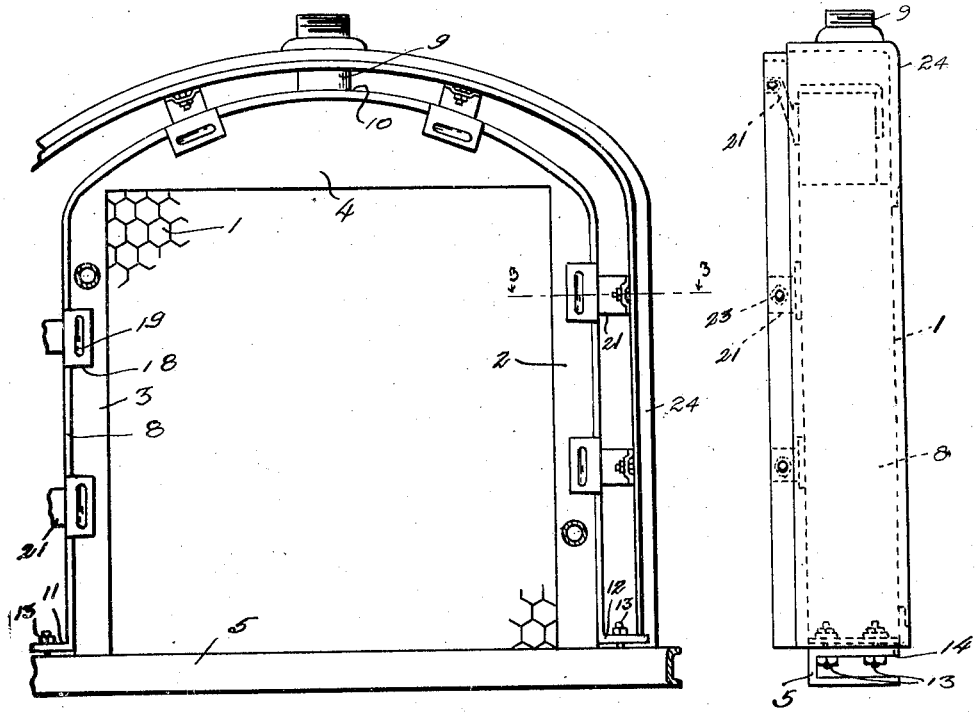
-FIG-1-
-FIG-2-
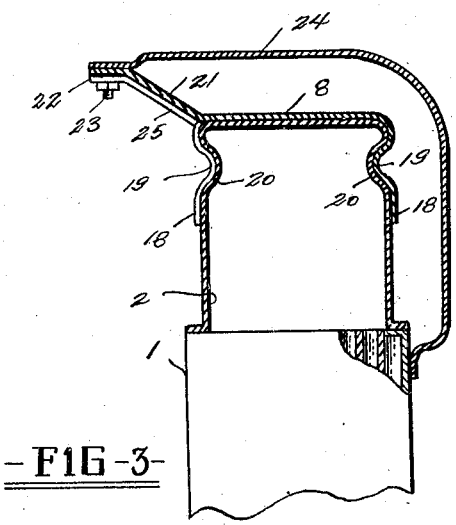
-FIG-3-
INVENTOR.
W. W. MUIR,
BY
ATTORNEY.

Nov. 26, 1929.  W. W. MUIR  1,737,057
ANCHORAGE FOR AUTOMOBILE RADIATORS
Filed Dec. 6, 1926  4 Sheets-Sheet 2
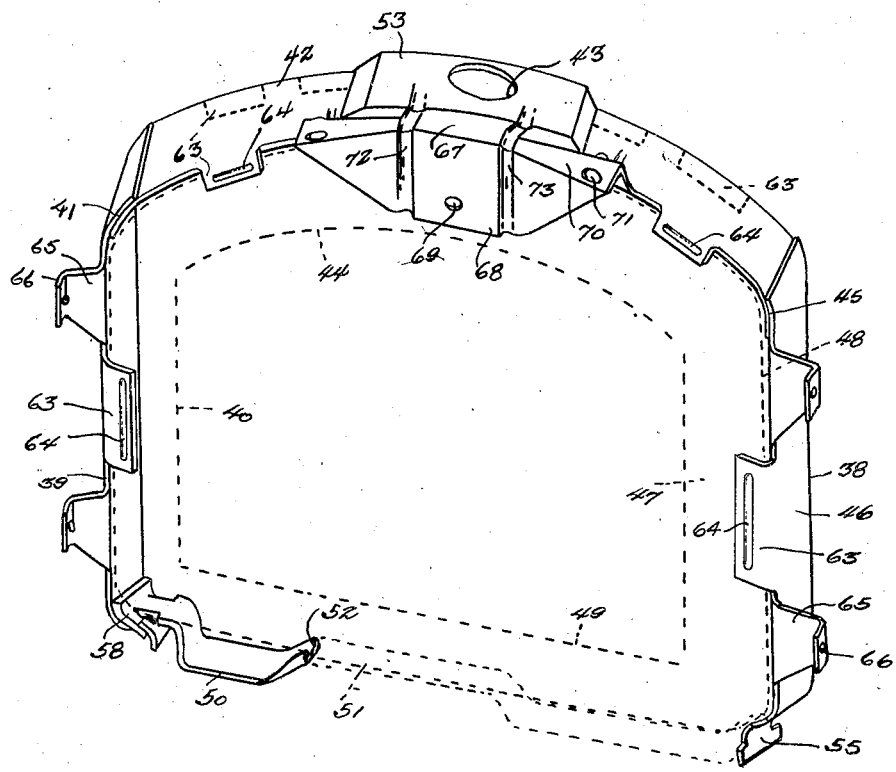
-FIG-4-
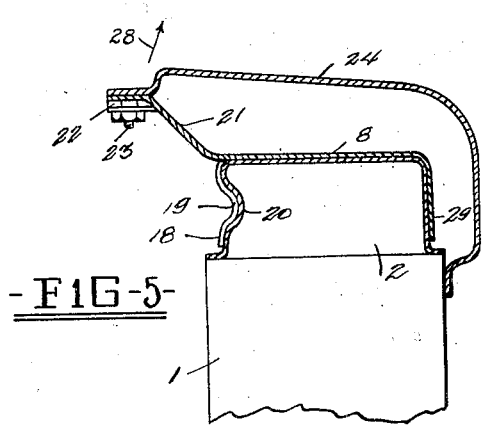
-FIG-5-
INVENTOR.
W. W. MUIR,
BY
ATTORNEY.

Nov. 26, 1929.  W. W. MUIR  1,737,057
ANCHORAGE FOR AUTOMOBILE RADIATORS
Filed Dec. 6, 1926  4 Sheets-Sheet 3
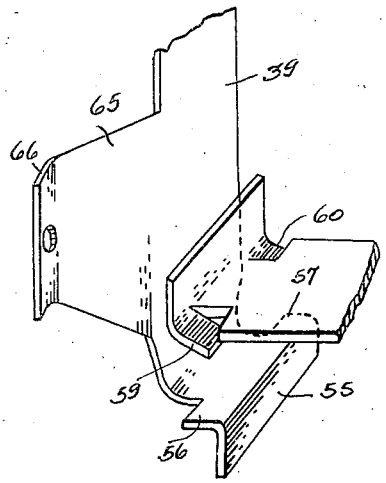
-FIG-6-
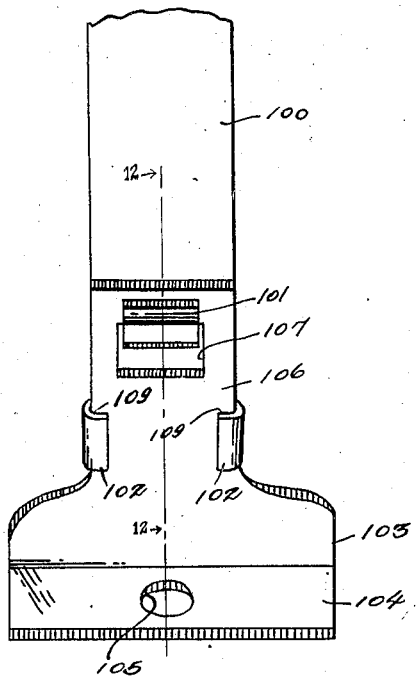
-FIG-7-
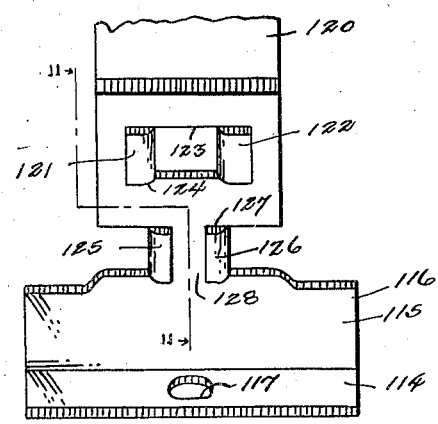
-FIG-8-
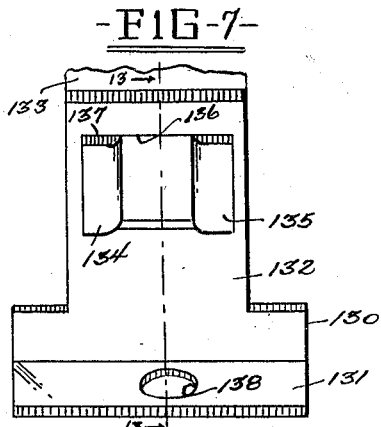
-FIG-9-
INVENTOR.
W. W. MUIR
BY
ATTORNEY.

Nov. 26, 1929.                W. W. MUIR                1,737,057
                ANCHORAGE FOR AUTOMOBILE RADIATORS
                    Filed Dec. 6, 1926        4 Sheets-Sheet 4
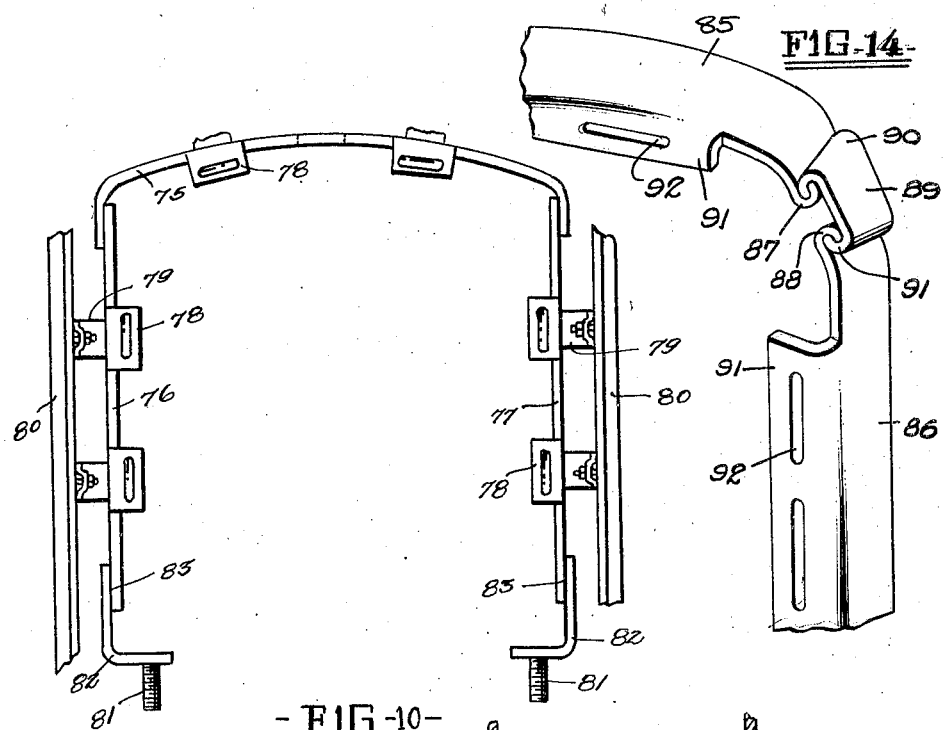
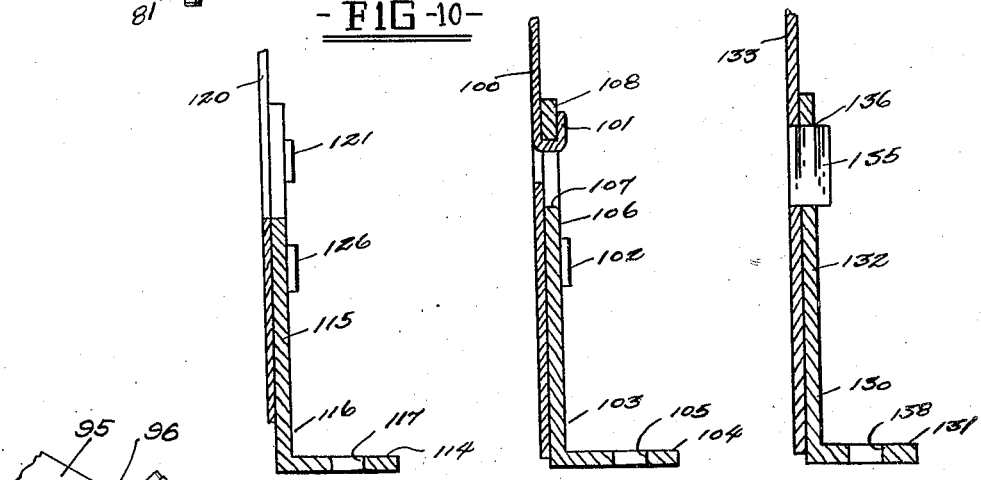
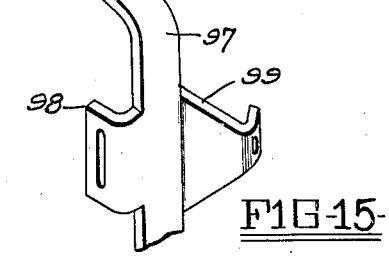
INVENTOR.
W. W. MUIR,
BY
ATTORNEY.

Patented Nov. 26, 1929

1,737,057

UNITED STATES PATENT OFFICE

WELLINGTON W. MUIR, OF LOCKPORT, NEW YORK, ASSIGNOR TO HARRISON RADIATOR CORPORATION, OF LOCKPORT, NEW YORK

ANCHORAGE FOR AUTOMOBILE RADIATORS

Application filed December 6, 1926. Serial No. 152,934.

This invention relates to anchorages for radiators, and has for its object to provide a construction which will be more simple to manufacture and more efficient in use than those heretofore proposed.

With these and other objects in view the invention consists in the novel details of construction and combinations of parts as will be more fully hereinafter disclosed and particularly pointed out in the claims.

Referring to the accompanying drawings forming a part of this specification in which like numerals designate like parts in all the views;

Fig. 1 is an elevational view of an automobile radiator to which this invention has been applied;

Fig. 2 is a side view of the parts illustrated in Fig. 1;

Fig. 3 is a partial horizontal sectional view of the invention as applied to the radiator shown in Fig. 1;

Fig. 4 is a perspective view of a modified form of the radiator anchorage;

Fig. 5 is a view similar to Fig. 3 showing a somewhat modified form of construction;

Fig. 6 is a detail fragmentary view of the locking means employed in the modified form of the invention shown in Fig. 4;

Fig. 7 is a detail of fastening means employed between the radiator anchorage and the chassis of the automobile.

Fig. 8 is a view similar to Fig. 7 but illustrating a modified form of fastening;

Fig. 9 is another modified form of the fastening means illustrated in Fig. 7;

Fig. 10 is a diagrammatic or skeleton view of a modified form of anchorage;

Fig. 11 is a vertical sectional view taken as on the line 11—11 of Fig. 8 and looking in the direction of the arrows;

Fig. 12 is a vertical sectional view taken as on the line 12—12 of Fig. 7 and looking in the direction of the arrows;

Fig. 13 is a vertical sectional view taken as on the line 13—13 of Fig. 9 and looking in the direction of the arrows;

Fig. 14 is a fragmentary perspective detail showing a still further modified form of the fastening means between two sections of the anchorage strip; and Fig. 15 is a similar fragmentary perspective view showing a still further modified form of the fastening means between two sections of the anchorage.

In order that this invention may be the better understood it is said that the securement of an automobile radiator to the chassis has been a matter not satisfactorily worked out in the past, the real problem presented residing in the fact that it is extremely difficult to firmly secure to said chassis the relatively weak structure of the radiator. Stated in still other words, the automobile radiator has little structural strength in and of itself, due to the very large honeycomb or air passage area thereof which is made of very thin sheet brass or composition thereof. The problem, therefore, has been to provide such a fastening means as will not injure the radiator structure and yet at the same time be strong enough to form a union between the radiator and the chassis which will withstand the vibrations of, and severe usage common to, an automobile.

In Fig. 1 is illustrated a radiator 1 of well known construction comprising the usual central honeycomb core having the side tanks 2 and 3 and the top tank 4 secured thereabout, the side tanks extending to the bottom of the core so that when the radiator is placed on the frame member 5 of the chassis, the side tanks 2 and 3 will rest thereon and, together with the member 5, constitute a framing of considerable strength in order to protect the weak core.

A continuous band 8 of relatively thin but tough metal is applied about the outer surface of the side and top tanks, said band being provided with a suitable opening adapted to fit about the usual filler pipe 9 as at 10. The band 8 has each of its ends out-turned as clearly indicated at 11 and 12 and apertured to receive therethrough the fastening bolt 13 which permits the band 8 to be drawn tightly about the radiator by turning the nuts associated with said bolts 13 all as will be readily understood. With particular reference to Fig. 2 it will be seen that the bolts 13 extend through the upper flange 14 of the front frame member 5 of the chassis upon which the radiator rests and therefore the tighter the nuts on the bolts 13 are drawn, the more will the band 8 be tightened about the radiator. Thus it will be seen that the radiator 1 can be securely clamped to the chassis of the automobile.

With particular reference to Figs. 1 and 3 it will be observed that the band 8 is provided with lateral tabs or extensions 18 of substantially rectangular formation and adapted to be bent with relation to the main body portion of the band 8 to form therewith substantially a right angle. These tabs 18 are provided on both edges of the band 8, the entire structure being of such dimensions that the main body portion of the band is the same width as the thickness of the side and top tanks so that the tabs 18 will lie in contact with the front and back faces or surfaces of said tanks. Each tab 18 is provided with an inwardly directed indentation 19 adapted to frictionally engage and be seated in a corresponding inwardly directed indentation 20 provided in the wall of the tank, so that when the band 8 with its tabs 18 are properly applied about the radiator 1, the band will be held in locked relation with the tanks so that it will be practically impossible for any side weaving of the radiator with respect to its mounting. In other words, the anchor band 8 will be so secured to the radiator as to substantially be a part thereof, thus obviating the necessity of soldering the two together.

Again referring to Figs. 1 and 3 it will be observed that the band 8 is provided also along one of its edges with an extension 21 directed outwardly or away from said band, the end 22 of said extension being suitably apertured to receive therethrough the bolt 23 for securing the outer ornamental shell 24 of the radiator in spaced relation to the radiator 1. The extension 21 may be provided with any suitable means for stiffening the same, as for example, a longitudinally extending deformation constituting a central strengthening rib 25 as well known.

The tabs 18 and the extension 21 are provided in a plurality of positions along the band 8, the drawings showing them as disposed two on a side and two at the top, but it is to be understood that there could be more of these members, the number thereof being selected as best suited to the shape and size of the radiators. They should be positioned, however, along the length of the band at substantially equal intervals, so that the radiator shell 24 will be the better secured in its spaced relation with the radiator per se.

With particular reference to Figs. 3 and 5 (the latter illustrating, however, only one tab 18 provided with the indentation 19), it will be seen that the indentations 19 and their associated tank indentations 20 are so disposed that any force placed on the shell 24 in the direction of the arrow 28 will not be permitted to separate the anchor band 8 from the radiator 1. In other words, when such a force is applied, the tank indentation 20 will hold the tab indentation 19 with considerable spring-like friction which will resist the force and thus keep the parts in assembled or interlocked position. Manufacturing costs are reduced by providing the interlocking indentations on one side only of the radiator. That is to say, the tab 29 corresponding to the tab on the other side of the tank, need not necessarily be provided with an indentation coacting with the companion indentation of the tank because the force indicated by the arrow 28 will operate at the point where the shell 24 is secured to the radiator 1, or in other words, the force will be transmitted to where the extension 21 joins the band 8.

Referring particularly now to Fig. 4 there is disclosed a modified form of the invention in which the anchorage band, generally indicated by the numeral 38, is not made entirely in one piece as was the band 8, but on the other hand, is made of a plurality of sections. That is to say, this modified band 38 comprises a side strip 39 adapted to contact with the outer vertical wall of a side tank 40, the upper end of said strip adapted to form a soldered joint 41 with one end of a top strip 42 provided with a central opening 43 adapted to fit the usual filler neck of the radiator, said strip 42 further adapted to contact with the outer wall of the upper tank 44 of the radiator. The other end of the top strip 42 is adapted to form a similar soldered joint 45 with the upper end of a strip 46 similar to the strip 39 and adapted to contact with the outer vertical wall of the opposite side tank 47 of the radiator. Thus it will be seen that by this construction there is provided an anchorage band 38 which is adapted to closely and contactingly fit about the outer tank surface of the radiator generally indicated by the numeral 48, and which is provided, as indicated in phantom lines, with the upper tank 44, the two side tanks 40 and 47, and a bottom tank 49. The bottom tank 49 rests on a base member 50 having its central portion raised as at 51 to form a more or less spring arch for the radiator proper 48. This base member 50 has the two side edges of the arch 51 upturned to provide the channel 52 in which the bottom tank 49 of the radiator is adapted to closely fit, so that said bottom tank will be prevented from transverse movement relative to the base member 50.

With particular reference to Figs. 4 and 6 it will be observed that the lowermost ends of the side strips 39 and 46 are inwardly bent as indicated at 55 and provided in its side edges adjacent the extreme end with opposite shoulders 56 and 57. Each end of the base member 50 is upwardly and outwardly turned as indicated at 58 and near its extreme end portion there are provided, in the side edges of said member, downwardly bent tongues 59 and 60, formed by slitting, which are adapted to register with and fit in under the aforementioned shoulders 56 and 57 of each side strip 39 and 46, to hold the entire anchorage band in interlocked relation with the base member 50, all as clearly illustrated in said Figs. 4 and 6. For ease in assembling, the radiator 48 may be placed on the base member 50, each side strip member 39 and 46 then secured by hooking to the base member 50 in interlocked relation, and the top strip member 42 then placed over the top tank 44 of the radiator. The side strips may then be forced inwardly against the side tanks of the radiator during which action the locked joint with the base member 50 will be made tighter, and the upper end of said side strips then soldered to the ends of the top strip 42, forming a reinforced framework about the radiator 48. The base member 50 may be secured in any suitable way to the chassis as by passing bolts through the depressed portions of said member disposed on either side of the raised central arch 51, said means of securement not being shown in Fig. 4 for the sake of clearness, but readily understood.

One of the longitudinal edges of the side strips 39 and 46 and both longitudinal edges of the upper strip 42 are provided with turned over tab portions 63, said tabs being further provided with indentations 64 adapted to interlock with corresponding indentations in the side and top tanks of the radiator 48, in the same manner as the tabs 18 with their indentations 19 interlocked with corresponding indentations 20 in the tank portion of the construction shown in Fig. 1. Also the side strips 39 and 46 are provided with the spacing tabs or tongues 65 having the turned over end portions 66 adapted to contact with and be secured to the outer ornamental shell of the radiator (not shown) exactly as was the band 8 provided with similar extensions 21 in the construction shown in Fig. 1. By this construction it will be seen that with the provisions of the interlocking indented tabs 63 on both longitudinal edges of the upper strip member 42, and with the provision of the upturned central edge portions of the bottom members 50 forming sides of the channel 52, the radiator 48 is securely fastened at both the top and the bottom from any transverse movement of the anchorage 38, and therefore there is necessitated the provision of the indented interlocking tabs 63 along only one edge of the side strips 39 and 46. It is to be observed that the tabs 63 are provided on the same edge of the side strips 39 and 46 with the tongues 65 for spacing the ornamental shell from the radiator proper, in accordance with Fig. 5 of the drawings.

The upper strip member 42 has its central portion provided with a substantially rectilinear extension consisting of the raised upper plate member 67 and the downwardly depending plate portion 68 which is substantially parallel to the rear face of the radiator 48. This plate 68 is provided with an aperture 69 adapted to receive the forward end of the reach rod (not shown) customarily used in making more rigid the erection of the radiator at the forward end of the automobile, said reach rod holding the top of said radiator in spaced relation with the dash board of the automobile. The upper plate 67 is provided with suitable curved portions 70 apertured as at 71 to receive securing means by which the curved top of the ornamental shell is fastened to the upper plate 67. The entire structure comprising the upper plate 67 and the downwardly depending plate portion 68 is provided with a plurality of channels or indentations 72 and 73 forming strengthening ribs for the otherwise relatively thin metal from which the upper and side strip portions of the anchorage are made. In this connection it should be stated that the bottom member 50 is formed of relatively much stronger material than the side and top anchorage strips.

This modified form of construction shown in Fig. 4 involves the same principle as that shown in Fig. 1 in that there is provided a continuous band anchoring the radiator to the chassis of the machine which is adapted to prevent any side weave of the radiator tending to displace the same. It further provides a protective casing around the exterior tank surface of the radiator and provides a spring connection through the tongues 65 with the outer ornamental shell so that said shell may give, or have substantial movement, without transmitting all of said movement to the radiator proper with detrimental effects on the latter, such as causing leaks or more serious damage.

Referring particularly to Fig. 10 there is disclosed another modified form of the invention similar to Fig. 4 in that the upper strip member 75 is soldered at its outer ends to the side strip members 76 and 77. It will also be observed that both the upper strips and the side strips are provided with indented tabs 78 adapted for interlocking relation with corresponding indentations in the tank portions of the radiator about which this modified form of anchorage is placed. Also the side strips 76 and 77 are provided with spacing tongues 79 for securing the ornamental shell 80 in spaced relation with the radiator proper. However, the anchoring means shown in Fig. 10 is applied to the radiator by spreading the side strips apart while soldered to the upper strip and slipping the entire anchorage band around the upper and side portions of the radiator, snapping the indented tabs 78 into their corresponding tank indentations and then drawing the lowermost ends of the side strips in towards the radiator so that the threaded shank portions 81 of the brackets 82, soldered or otherwise rigidly secured as at 83 to the lowermost ends of the side strips, may register with and pass downwardly through apertures therefor provided in the frame member of the chassis of the automobile, and nuts then applied thereto for rigidly fastening the radiator and its anchorage to said chassis.

The modified form of the invention shown in Fig. 14 is somewhat similar to the construction shown in Fig. 10 except that the upper strip member 85 is not soldered to a side strip member 86. On the other hand, the adjacent extreme end portions of said strips are outwardly turned over as clearly indicated at 87 and 88 to form a short hook, the edge of which is obliquely disposed to a right line of the face of said strips. As clearly illustrated in said Fig. 14 the obliqueness of these hooked ends 87 and 88 are such that if the lines of their edges were prolonged they would meet. Over these hooked ends 87 and 88 a clip 89 is adapted to be placed, said clip having its ends turned under as at 90 and 91 to fit the hooks 87 and 88 respectively. When the clip 89 is driven transversely of the strips 85 and 86 it will be clear from Fig. 14 that there is a wedging action which has the tendency to draw together tightly the hooked ends 87 and 88 of said strips thus increasing the pressure of said strips on the encompassed radiator. The strip portions in this modified form are likewise provided as heretofore described with turned over edge portions constituting tabs 91 provided with indentations 92 adapted to engage corresponding indentations provided in the side walls of the top and side tanks of the radiator and it should be observed that these tabs 91 are provided on that edge of the strips which would prevent said strips from slipping off the outer tank surface of the radiator when the locking or wedge clip 89 is driven into position to draw the strips together. In this form of construction the lower ends of the side strip members may be rigidly secured in any way to the chassis of the machine, leaving all of the tightening of the anchorage strips to be accomplished through the application of the wedge clamp 89. It is of course to be understood that only one wedge 89 is shown in Fig. 14, but there is provided another wedge at the other end of the top strip member 85. The wedge 89 and coacting hook ends 87 and 88 form a strong convenient fastening means which may be substituted for the soldered joints shown in Figs. 4 and 10, especially when the radiator is of thin material.

In Fig. 15 is shown a modified form of the invention similar to Fig. 14. That is to say, the upper strip member 95 has each end portion out-turned and apertured to receive a fastening bolt as indicated at 96 adapted to fastening pass through an aperture in the likewise out-turned end portion of each side strip member 97 only one of which is shown. The top and side strips may likewise be provided with indented tabs 98 for interlocking with corresponding indentations in the wall of the tank structure of the radiator, and also be provided with spacing tongues 99 coacting with the outer ornamental shell of the radiator. The lower ends of the side strips 97 may be rigidly secured in any convenient manner to the chassis of the automobile and the anchorage bands firmly secured about the radiator and to each other by application of power to the threaded bolts 96, thus drawing the side strips and the upper strip tightly about the radiator all as will be readily understood from the foregoing and with particular reference to Fig. 15 which is fragmentary and of general diagrammatic nature.

The side strips described in the various forms of this invention, such as shown in Figs. 1, 14 and 15, may have various means for securing the lower ends thereof to the chassis frame, some of the more efficient means being illustrated in Figs. 7, 8, 9, 11, 12 and 13. That is to say, a side band 100, see Figs. 7 and 12, has a tongue 101 formed therefrom by suitable punch operation in its lower central portion and adjacent said tongue each side edge of said strip has formed, therewith, a locking tab 102 extending laterally of said strip. A foot generally indicated by the numeral 103, of heavier material than the anchorage band 100, is provided with a base portion 104 apertured as at 105 to receive a bolt for securing said member to the chassis frame. The main body portion of the foot 103 is bent at right angles to the base member 104 and comprises an extended central portion 106 of reduced width, or in other words, of the same width as the anchorage band 100, and provided in the upper central portion thereof with a substantially rectangular opening 107 through which the tongue 101 of the band 100 is adapted to be forced. In the stamping operation by which the bands 100 are formed, a foot 103 may be introduced to the machine and the tongue 101 of the band 100 forced through the opening 107 of the foot, bent over one edge thereof and pressed down tightly to form a clinched joint 108 as clearly illustrated in Fig. 12. During the stamping operation, the tabs 102 may be bent around the side edge portions of the main body portion 106 of the foot as clearly shown in Fig. 7, to form the clinched joints 109. Thus it will be seen that the foot 103 is drawn toward the chassis frame through the operation of the nutted bolt (not shown) passing through the aperture 105, the tongue 101 as well as the clinched joints 109 will cause the pressure to be transmitted to the anchorage strip 100, pulling the same into tight contact with the outer surface of the tanks of the radiator.

In Figs 8 and 11 are shown a modified form of the foot construction of Fig. 7. In other words, the base member 114 is formed at right angles to the main body portion 115 of the foot 116 and suitably apertured as at 117 to receive the draw bolt (not shown) by which the anchorage is secured to the chassis. The lowermost end of the side strip 120 is punched to provide two opposed tongues 121 and 122 adapted to pass through the aperture 123 provided in the enlarged end of the main body portion 115 of the foot and to be tightly clamped about the edges of said aperture to form a clinched joint 124. The side edges of the anchorage 120 are doubly slitted inwardly to provide tongue portions 125 and 126 which are opposed to each other and adapted to be clinched as at 127 around a reduced neck portion 128 formed in the main body portion 115 of the foot. Thus it will be seen that when pressure is applied to draw the foot 116 toward the chassis, the pressure will be transmitted through the edge portions of the tongues 121, 122, 125 and 126 against the cooperating edges of the main body portion 115 of said foot thus producing a stronger joint between the band 120 and said foot than might otherwise be obtained. Such a construction as above described has been proved by actual tests to be greatly stronger than riveted joints which are costly, and said construction is successful where soldered joints are impractical due to the relative thinness of the anchorage bands with respect to the foot member employed.

In Figs. 9 and 13 are disclosed a still further modified form of foot 130 having the base portion 131 provided with the aperture 138 for the drawing bolt (not shown) by means of which the foot is secured to the chassis. The main body portion 132 of the foot is formed at right angles to the base portion and made substantially of the same width as the side anchorage strip 133 to which it is adapted to be secured. Opposed tongues 134 and 135 are formed in the central lower portion of the band 133, said tongues adapted to be pressed through and clinched around the edges of an aperture 136 formed in the central portion of the main body portion 132 of the foot to form the clinched joint 137 as clearly indicated in the figures. This form of construction omits the second set of tongues shown at 125 and 126 in Fig. 8, but, to compensate therefor, the tongues 134 and 135 are made of a longer length longitudinally of the band 133 whereby substantially the same strength is obtained as in the form of fastening shown in Fig. 8. As heretofore described the force produced in screwing the draw bolt (not shown) is transmitted through the interlocked tongues 134 and 135 and the edge of the aperture 136 of the foot 130 to the anchor band 133, thus drawing the latter in tight contact about the outer surface of the tanks of the radiator.

From the foregoing it will thus be seen that by this invention there is provided an interlocking removable means constituting the band 8 for clamping the radiator to the frame 5 of the automobile, in combination with spring-like means comprising the spacing extensions 21 for securing the shell 24 to the clamping means 8, as well as means comprising a groove 19 in the tabs 18 cooperating with similar grooves or indentations 20 in the tanks associated with the radiator which are adapted to maintain the clamping band 8 in interlocking contact with the radiator. It is also to be observed that the ornamental shell 24 is secured to the radiator proper in spaced yieldable relation to the band 8, the extensions or tongues 21 will give when lateral pressure is exerted on said ornamental shell.

It is obvious that those skilled in the art may vary the details of construction as well as the arrangements of parts without departing from the spirit of the invention and therefore it is not desired to be limited to the foregoing disclosure except as may be demanded by the claims.

What is claimed is:—

1. In an anchorage for automobile radiators and the like having a plurality of indentations and including an ornamental shell the combination of a removable clamping for securing said radiator to the frame of the automobile; extensions associated therewith for securing said shell to said clamp; and other spring extensions associated with said clamp engaging said indentations to maintain the clamp in interlocked spring contact with said radiator.

2. In an anchorage for automobile radiators and the like having a plurality of indentions and including an ornamental shell the combination of a removable clamp for frictionally securing said radiator to the frame of the automobile; yieldable extensions associated therewith for securing said shell in spaced relation to said clamp; and other spring extensions integrally associated with said clamp engaging said indentations to maintain the clamp in interlocked spring contact with said radiator.

3. In an anchorage for automobile radiators and the like having a plurality of indentations and including an ornamental shell the combination of a removable clamp for securing said radiator to the frame of the automobile; means associated therewith comprising a plurality of spring-like spaced integral tongues for securing said shell to said clamp;

and spring extensions associated with said clamp provided with projecting portions adapted to interlock springingly with the indentations of said radiator to resist any lateral force exerted thereon by said shell.

4. In an anchorage for automobile radiators and the like provided with side tanks, a top tank, and an ornamental shell thereabout the combination of a removable clamp for securing said radiator to the frame of the automobile; a plurality of extensions associated therewith for securing said shell to said clamp; a plurality of grooves in the wall of one of said tanks; and a second plurality of extensions associated with said clamp and springingly coacting with said groove, adapted to maintain said clamp in interlocked contacting relation with said radiator to resist any lateral force tending to separate the same.

5. In an apparatus of the class described the combination of a radiator core for automobiles; a tank associated with said core; a frame member supporting said core and tank; a groove in the walls of said tank; and a binder under tension about said core and tank to secure the same to said frame member, said binder provided with means springingly coacting with said groove to hold said tank and band in interlocked relation.

6. In an apparatus of the class described the combination of a radiator core for automobiles; a tank associated with said core; an ornamental shell to cover said core and tank; a frame member supporting said core and tank; a groove in the wall of said tank; and a binder under tension about said core and tank to secure the same to said frame member, said binder provided with means springingly coacting with said groove to hold said tank and binder in interlocked relation, as well as with means to secure said shell in spaced yieldable relation to said binder.

7. In an apparatus of the class described the combination of a radiator core for automobiles; top and side tanks protectively associated with said core; a frame member supporting said core and tanks; a groove in the wall of said tanks; and a binder under tension about said core and tanks to secure the same to said frame member, said binder provided with means springingly coacting with said groove to hold said tanks and binder in interlocked relation.

8. In an anchorage for automobile radiators and the like the combination of a binder disposed about the edge portion of the core and tank structure of said radiator; a plurality of indentations in a side of the tank portion of said radiator; and a plurality of extensions associated with said binder each extension projectingly engaging one of said indentations.

9. In an anchorage for automobile radiators and the like the combination of a binder under tension disposed about the edge portion of the core and tank structure of said radiator said binder provided with means for securement to the frame of the automobile; a plurality of indentations in a side of the tank portion of said radiator; and a plurality of extensions associated with said binder each extension projectingly and springingly engaging one of said indentations.

10. In an anchorage for automobile radiators and the like the combination of a binder disposed about the edge portion of the core and tank structure of said radiator; a plurality of indentation in a side of the tank portion of said radiator, said indentations being in spaced relation; and a plurality of correspondingly spaced extensions associated with said binder each extension projectingly engaging one of said indentations.

11. In an anchorage for automobile radiators and the like the combination of a binder disposed about the edge portion of the core and tank structure of said radiator; a plurality of indentations in opposite walls of the tank portion of said radiator; and a plurality of tabs associated with said binder and extending from opposite edges thereof, each tab provided with a projecting portion engaging one of said indentations.

In testimony whereof I affix my signature.

WELLINGTON W. MUIR.